United States Patent
Shachar et al.

(10) Patent No.: US 9,740,611 B2
(45) Date of Patent: Aug. 22, 2017

(54) MEMORY MANAGEMENT FOR GRAPHICS PROCESSING UNIT WORKLOADS

(71) Applicant: Advanced Micro Devices, Inc., Sunnyvale, CA (US)

(72) Inventors: Yair Shachar, Ramat-Gan (IL); Einav Raizman-Kedar, Kfar Vradim (IL); Evgeny Pinchuk, Even-Yehuda (IL)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 237 days.

(21) Appl. No.: 14/526,856

(22) Filed: Oct. 29, 2014

(65) Prior Publication Data
US 2016/0124852 A1    May 5, 2016

(51) Int. Cl.
G06T 1/60 (2006.01)
G06F 12/08 (2016.01)
G06F 12/1081 (2016.01)
G06F 9/45 (2006.01)
G06F 11/34 (2006.01)

(52) U.S. Cl.
CPC ............... *G06F 12/08* (2013.01); *G06F 8/41* (2013.01); *G06F 11/34* (2013.01); *G06F 12/1081* (2013.01); *G06T 1/60* (2013.01); *G06F 2212/1016* (2013.01); *G06F 2212/1044* (2013.01); *G06F 2212/302* (2013.01); *G06F 2212/601* (2013.01); *G06F 2212/6028* (2013.01)

(58) Field of Classification Search
CPC .... G06T 1/60; G06F 12/08; G06F 2212/6028
USPC ................. 345/530, 541, 543, 544
See application file for complete search history.

(56) References Cited

U.S. PATENT DOCUMENTS

| | | | |
|---|---|---|---|
| 8,799,554 B1 * | 8/2014 | Vincent | G06F 9/5016 711/137 |
| 2003/0210248 A1 * | 11/2003 | Wyatt | G06F 12/0888 345/541 |
| 2007/0132770 A1 * | 6/2007 | Stefanidis | G06T 1/60 345/541 |
| 2013/0031298 A1 * | 1/2013 | Tan | G06F 12/0246 711/103 |

* cited by examiner

*Primary Examiner* — Jacinta M Crawford
(74) *Attorney, Agent, or Firm* — Volpe and Koenig, P.C.

(57) ABSTRACT

A method, a device, and a non-transitory computer readable medium for performing memory management in a graphics processing unit are presented. Hints about the memory usage of an application are provided to a page manager. At least one runtime memory usage pattern of the application is sent to the page manager. Data is swapped into and out of a memory by analyzing the hints and the at least one runtime memory usage pattern.

15 Claims, 8 Drawing Sheets

MEMORY MANAGEMENT FOR GRAPHICS PROCESSING UNIT WORKLOADS

TECHNICAL FIELD

The disclosed embodiments are generally directed to memory management, and in particular, to implementing a paging mechanism for one or more graphics processing units.

BACKGROUND

A graphics processing unit (GPU) may be used for non-graphics related tasks, for example, general purpose computing on a GPU (GPGPU). In the GPGPU scenario, computing tasks may be offloaded from a related central processing unit (CPU) to the GPU. As such, the GPU may need to access memory that is external to the GPU. FIGS. 1A, 1B, and 1C show three different configurations for a GPU and a CPU. It is noted that these configurations are exemplary and that other configurations of a GPU and a CPU sharing a common memory are possible.

FIG. 1A shows a first configuration 100. In the configuration 100, a CPU 102 communicates with a system memory 104 and an input/output memory management unit (IOMMU) 106. The IOMMU 106 communicates with a GPU 108. In the configuration 100, the GPU 108 may access the system memory 104 via the IOMMU 106. The IOMMU 106, with the proper supporting software, additionally provides the option of references to the system memory 104 to be non-resident. Usually, in the configuration 100, a CPU application first registers blocks of virtual memory data. As long as these blocks are resident in the system memory 104, whenever such an address is requested by the GPU 108, the GPU 108 sends an Address Translation Service (ATS) request to the IOMMU 106 to obtain the corresponding physical memory address.

If the blocks are not resident in the system memory 104, dedicated CPU software handles this request (for example, a Peripheral Page Service Request (PPR)), verifies that the corresponding blocks are swapped into the system memory 104, returns control to the IOMMU 106, and lastly returns control to the GPU 108. In the case where the blocks are not resident in the system memory 104, the relatively long turnaround time may reduce the overall GPU performance, unless the proportion of PPR requests out of the general number of system memory requests originated by the GPU is relatively low.

For the system memory 104, the IOMMU 106 handles the paging for the GPU 108. The IOMMU 106 translates memory accesses (e.g., a virtual address) to a physical address per the GPU's request. If the translation is successful, the GPU 108 receives the physical memory address from the IOMMU 106 and can then request access to the physical address through the CPU memory controller (not shown in FIG. 1A). But this process requires a lot of overhead, even if there is a hit during the translation (i.e., the data associated with the translated address is immediately available—e.g., in cache). If the virtual address requested is not resident in memory, then it needs to be fetched from secondary storage, which involves an even longer delay, because the memory access must now be serialized through the CPU 102 and eliminates the benefits of the parallel performance of the GPU 108.

FIG. 1B shows a second configuration 120, in which a motherboard 122 and a video card 124 communicate via a bus 126. The motherboard 122 includes a CPU 130 and system memory 132. The video card 124 includes a GPU 134 and GPU memory 136. The GPU 134 may access the local GPU memory 136 or may access the system memory 132 over the bus 126. In an alternate implementation, the data needed by the GPU 134 may be transferred from the system memory 132 over the bus 126 to the GPU memory 136.

FIG. 1C shows a third configuration, of an accelerated processing unit (APU) 140, which includes a CPU core 142 and a GPU core 144 resident on the same die, and which share a memory 146. It is noted that while the memory 146 is shown separate from the APU 140, in some implementations, the memory 146 may also be located on the same die as the APU 140.

In a CPU, there is an issue known as the "paging problem." There is a given amount of memory (either on-chip or off-chip) and occasionally, data from the main memory needs to be swapped out (i.e., paged out) to a secondary storage (disk, etc.). This may occur when an application has been inactive for a period of time. When the application is activated again and needs memory space, the previously swapped out data is swapped back into the memory from the secondary storage. The "problem" is that all of this swapping into and out of memory requires a lot of overhead.

Known algorithms on the CPU attempt to guess what will be the next memory area that will be used, and the data stored in that next memory area should not be swapped out of memory to the secondary storage, if possible. Alternatively, this information may be used to "read ahead," to load the data into memory from the secondary storage before it will actually be needed.

For a CPU and memory configuration, there are a variety of methods to handle similar cases, and are generally referred to as paging algorithms. A paging algorithm is characterized by the set of criteria it uses to determine which page blocks will be swapped into or out of the memory at given points in time, whenever the amount of physical memory is expected to be limited relative to the total current or predicted demand. A common paging algorithm is known as "least recently used," and swaps out page blocks which have not been used in a given time interval. Other paging algorithms are also common.

In a CPU environment, it is in general hard (and often almost impossible) to predict which page blocks are going to be accessed in the next given period of time. On a GPU, this problem is more acute than on a CPU. With a discrete GPU (DGPU; GPU on a separate card or location on a motherboard and the CPU on the motherboard, such as shown in FIG. 1B), there is local memory (on the DGPU card) and system memory (on the motherboard) that may be accessed by the DGPU. With an APU (such as shown in FIG. 1C), both the GPU and the CPU are on the motherboard and use the same physical memory. Some of this memory is reserved for the GPU, but most memory is allocated to the CPU. Currently, there is no hardware or hardware-supported memory paging mechanism in the GPU for the local memory.

SUMMARY OF EMBODIMENTS

Some embodiments provide a method for performing memory management in a graphics processing unit. Hints about the memory usage of an application are provided to a page manager. At least one runtime memory usage pattern of the application is sent to the page manager. Data is swapped into and out of a memory by analyzing the hints and the at least one runtime memory usage pattern.

Some embodiments provide a system for performing memory management in a graphics processing unit including a page manager, a compiler, and a runtime component. The page manager is configured to swap data into and out of a memory. The compiler is configured to compile a source code file of an application into an object code file of the application, generate hints relating to memory usage of the application, and send the hints to the page manager. The runtime component is configured to execute the object code file of the application, generate at least one runtime memory usage pattern of the application, and send the at least one runtime memory usage pattern to the page manager. The page manager swaps the data into and out of the memory by analyzing the hints and the at least one runtime memory usage pattern.

Some embodiments provide a non-transitory computer-readable storage medium storing a set of instructions for execution by a general purpose computer to perform memory management in a graphics processing unit. The set of instructions includes a providing code segment, a sending code segment, a predicting code segment, and a swapping code segment. The providing code segment provides hints about memory usage of an application to a page manager. The sending code segment sends at least one runtime memory usage pattern of the application to the page manager. The swapping code segment swaps data into and out of a memory based on the hints and the at least one runtime memory usage pattern.

Some embodiments provide a method for swapping a range of pages out of a memory. A memory range to be swapped out is selected, if an amount of free memory is below a threshold. The selected memory range is swapped out of memory if there are no hints available to suggest that the memory range will be used within a first predetermined period of time. If there are hints available, queue scheduling data for a queue associated with the selected memory range is obtained and the selected memory range is swapped out of memory if the queue is not scheduled to be active within a second predetermined period of time. The selected memory range is removed from a candidate list of memory ranges to be swapped out if the queue is scheduled to be active with the second predetermined period of time.

Some embodiments provide a system for swapping a range of pages out of a memory. The system includes an application, an operating system, and a processor. The application is compiled so as to provide hints about memory usage of the application. The operating system is configured to perform memory management, receive the hints from the application, and send the hints to other parts of the system. The processor is configured to execute the application, receive the hints from the operating system, and swap a selected memory range out of memory based on the hints and the at least one runtime memory usage pattern.

BRIEF DESCRIPTION OF THE DRAWINGS

A more detailed understanding may be had from the following description, given by way of example in conjunction with the accompanying drawings, wherein.

DETAILED DESCRIPTION

Figure 1A:
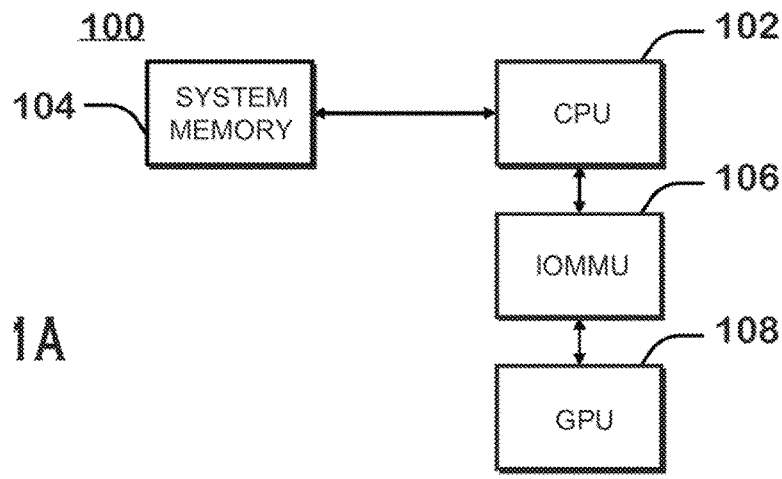
FIG. 1A is a block diagram of a first configuration for a GPU and a CPU.
Figure 1B:
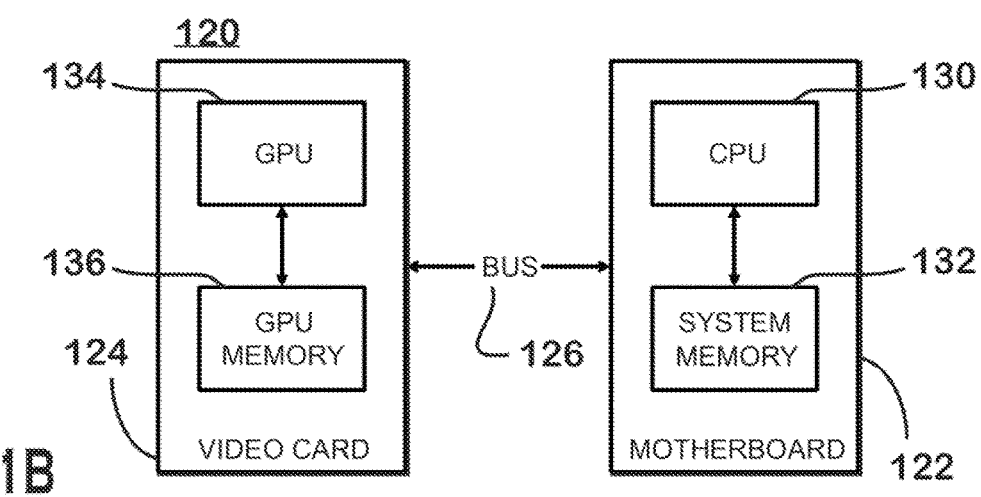
FIG. 1B is a block diagram of a second configuration for a GPU and a CPU.
Figure 1C:
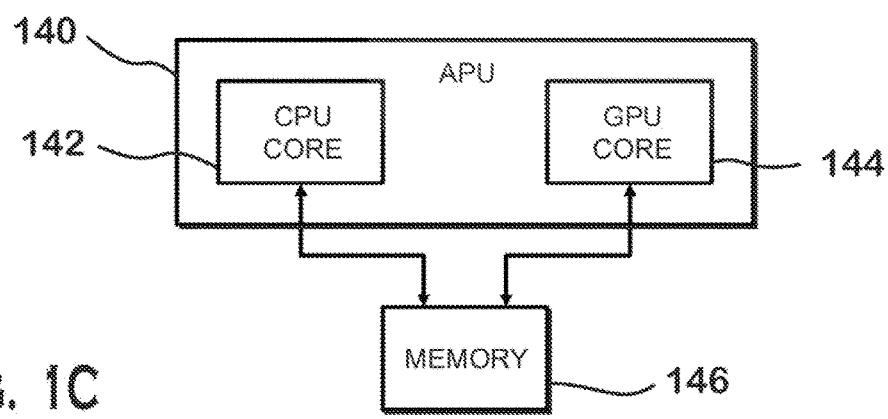
FIG. 1C is a block diagram of a third configuration for a GPU and a CPU.

A method, a device, and a non-transitory computer readable medium for performing memory management in a graphics processing unit are presented. Hints about the memory usage of an application are provided to a page manager. At least one runtime memory usage pattern of the application is sent to the page manager. Data is swapped into and out of a memory by analyzing the hints and the at least one runtime memory usage pattern.

In contrast to a CPU, a GPU is based on a plurality of identical computation units (CU), which are designed to perform an identical set of instructions in parallel. Having knowledge of the number of CUs and the expected allocation plan of CUs to different tasks may provide an indication on the short-term future usage of memory pages. In addition, GPU-based programs (known as "kernels"), often have a known-in-advance memory usage pattern which may be hinted to the paging management software.

In a GPU environment or in a compound CPU/GPU environment, the GPU architecture and the mechanisms by which workloads are compiled and dispatched for execution provide more options and capabilities to predict the next set or sets of memory blocks which will be accessed by the CPU. Based on predictions of which memory areas have the highest probabilities to be required within some period of time by GPU firmware or workload, these areas are temporarily protected from page swap operations. These probabilities are based on at least one of the following: hints from the application layer on the memory usage pattern of the application (also referred to herein as "code"), a relative memory range prediction, a workgroup size and number, static GPU hardware characteristics, dynamic GPU hardware characteristics, or dynamic activity status of a queue dispatching the workload.

On a GPU, there are more opportunities than on a CPU to improve the page swap algorithm, and the GPU properties can be exploited to optimize the paging algorithm. Paging mechanisms may be utilized directly over memory blocks, or indirectly through an operating system. In the latter case, the paging mechanisms lock and unlock pages in the memory, where locked pages are protected from swapping while unlocked pages may be subject to swapping, according to the operating system paging mechanisms.

Hints from the application layer on the memory usage pattern are based on taking the memory addresses used by the application and trying to find a periodic function which shows what range of addresses will be used next. It is noted that the memory usage pattern does not need to only be periodic (i.e., an exact repetition within a given period of time), but may be identified by, for example, gaps between address blocks that are monotonically increasing or decreasing over time.

In a CPU, it is difficult to determine the memory usage pattern, because it may appear to be random. Based on address ranges, the most-recently used paging algorithm may work some of the time. With a GPU, the usage of memory ranges over time is less random than on a CPU, meaning that it is relatively easier to determine the memory usage patterns. For example, in an application summing two large vectors, if implemented on a single CU, a linear advancing of the address range may be observed.

But on a GPU where the work is being performed in parallel and is segmented across different CUs, determining a memory usage pattern becomes more complicated. Each CU can access the same memory ranges in parallel, which makes the memory usage pattern difficult to determine. Knowing how the buffer is divided into smaller parts and used by each CU, the pattern may be more readily able to be determined, and it may be possible to determine the next address ranges to be accessed.

Memory usage is tracked on a CU level where a given CU is running one or more kernels of a certain process. Per each process, it is known which CUs are running one or more kernels corresponding to that process, and the paging algorithm is only concerned with the given process (and is not concerned with other CUs running different processes). Because the number of CUs and the workgroup size are known (based on the process being run), it is possible to predict computation levels over the next X milliseconds. In most cases, GPU workloads are periodic and expected because there is not much branching in the GPU code.

A process may use multiple queues. Work items are placed into the different queues. The work items are prefetched from the queues and are transmitted to the CUs for execution. There may be more queues than there are hardware queue slots that are available for execution. Some queues may not be attached to the hardware at a given point in time and may be waiting for the hardware to be free to be executed. A queue that is not attached to the hardware or that is otherwise not active will not need its memory (the GPU will not access this memory because the queue is not active). If the queue is not active, then it may be a good idea to swap out the memory context of that queue, and leave the memory context of active queues in the memory.

In general, the software stack contains at least one GPU driver, which communicates with the GPU hardware. The GPU driver can fetch information, such as which of the queues are currently attached to the hardware, as well as information on which CU or CUs are currently running data vectors corresponding to kernels of the current process, etc. The GPU driver may be regarded as part of the execution runtime component.

It is noted that while the description herein depicts a single GPU, the principles are applicable to a system constructed with multiple GPUs.

Figure 2:
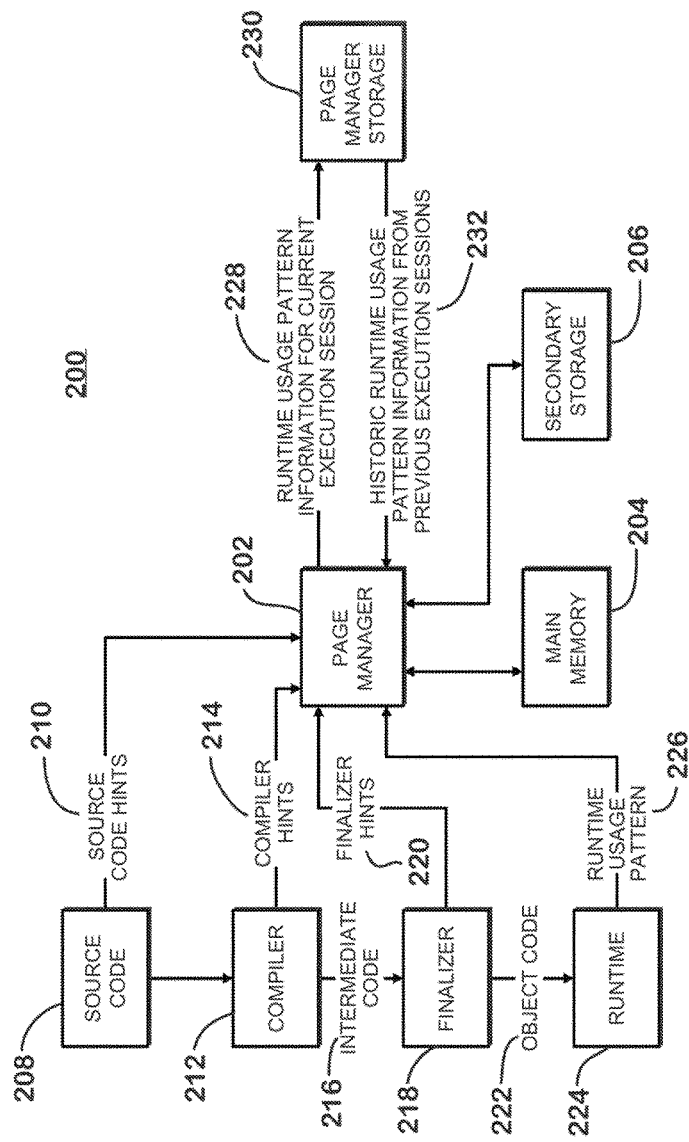
FIG. 2 is a diagram of a system configured to perform GPU memory paging.

FIG. 2 is a diagram of a system 200 configured to perform GPU memory paging. A page manager 202 performs page management, swapping pages between a main memory 204 and a secondary storage 206. A source code program 208 may include source code hints 210 that are supplied to the page manager 202. A developer may insert the source code hints 210 directly into the source code 208, relating to the memory usage pattern of the source code 208.

An application developer knows what the application is doing in terms of memory access. If possible, the developer can insert the source code hints to indicate the memory usage pattern of the application. For example, the source code hints may include a periodic function that describes the memory usage pattern. Other applications may be random in their memory usage, such that the developer cannot insert the source code hints.

The source code hints 210 are sent to the page manager 202 via an interface. Alternatively, the source code hints 210 may be passed to a compiler 212 and a finalizer 218 for further processing, to refine the source code hints.

The source code program 208 is processed by the compiler 212, which may generate compiler hints 214 for the page manager 202, and may generate intermediate code 216. The compiler hints 214 are generated by analyzing the source code 208 without regard to the specific hardware on which the code will ultimately be executed. This analysis may include, but is not limited to, determining loop patterns, determining parallel and serial code segments, and determining synchronization barriers. A synchronization barrier is a directive in the source code that indicates when the code needs to pause during execution to ensure that multiple parallel code blocks have completed execution. For example, code blocks A, B, C, and D may be executed in parallel, but the code needs to wait until all of these blocks have completed execution before proceeding to execute additional code. In an implementation, the intermediate code 216 may not be generated. In another implementation, the compiler hints 214 may be included in the intermediate code 216 to be further processed by the finalizer 218.

The compiler 212 calculates a possible predicted memory address pattern to be used by the code when the code will be executed. The compiler may predict a relative memory range, which upon providing data buffer addresses, can be converted to absolute addresses. The compiler may have better information than the runtime paging algorithm, because it can review the code and obtain data from it. In one implementation, these predictions may generate a pattern usage tree of possibilities, based on condition statements in the code.

Figure 3:
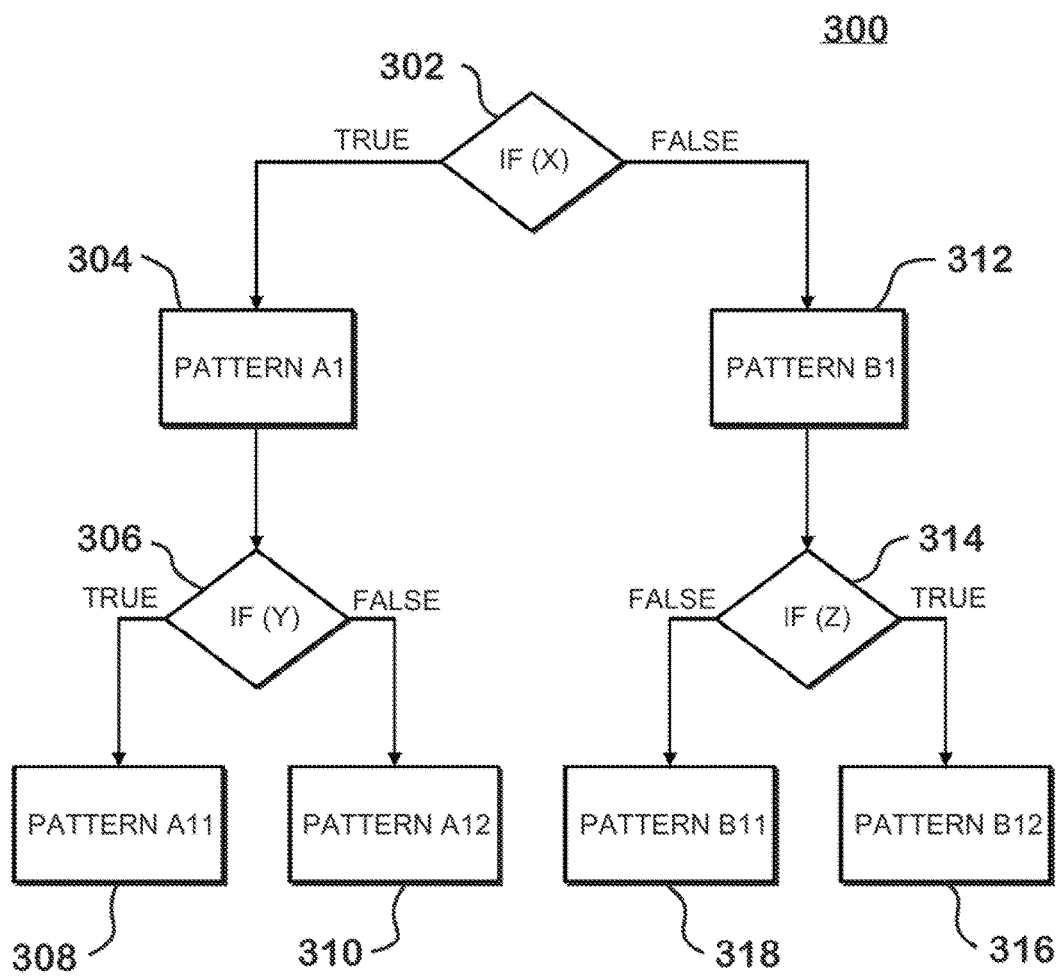
FIG. 3 is a diagram of an example pattern usage tree.

FIG. 3 is a diagram of an example pattern usage tree 300 based on a given code segment. A condition X is evaluated (step 302), and if the condition X is true, then pattern A1 is used (step 304). Then a condition Y is evaluated (step 306), and if the condition Y is true, then pattern A11 is used (step 308). If condition Y is false, then pattern A12 is used (step 310).

If the condition X is false (step 302), then pattern B1 is used (step 312). Then a condition Z is evaluated (step 314), and if the condition Z if true, then pattern B12 is used (step 316). If the condition Z is false, then pattern B11 is used (step 318).

Because the ratio between condition statements in the code and uniform code segments is lower in code that executes on a GPU than code that executes on a CPU, the pattern usage tree 300 is practical to generate and manage in a GPU environment.

Referring back to FIG. 2, the intermediate code 216 (if generated) is further processed by the finalizer 218, which may generate finalizer hints 220 for the page manager 202, and generates object code 222. The finalizer 218 is a final stage of the compilation process in which the code is reviewed just before it is dispatched and executed. The finalizer 218 is activated when the specific characteristics of the hardware where the code is to be executed are known. The specific characteristics include, for example, static hardware characteristics (which do not change at runtime), such as the number of CUs on the GPU, the "width" of each CU (meaning a number of threads that can be simultaneously executed by the CU), wavefront size, load data store (LDS), cache size, and memory size. The specific characteristics also include dynamic hardware characteristics, such as the number of CUs to be allocated for the current dispatch, the workgroup size (how the data set is divided into smaller parts), etc. The finalizer hints 220 may be generated independently by the finalizer 218 by analyzing the intermediate code 216 or by further processing the compiler hints 214.

The compiler (or the compiler and the finalizer together) may review the code to determine the predicted data patterns. For example, if the code includes nested loops, the memory usage pattern can be determined in a relative sense because it is not yet known exactly when data will be loaded into memory. But the buffer size, for example, will be known and the memory usage pattern can then be determined. Once the buffer is loaded into memory, the absolute address in memory is known and the absolute memory ranges to be used can be calculated.

The object code 222 is executed by a runtime component 224, which provides runtime usage pattern information 226 to the page manager 202. The runtime usage pattern information 226 relates to the memory page usage by the code during the current execution session. The memory usage pattern is generally monitored by a thread on a CPU (not shown in FIG. 2) that runs periodically, but not necessarily at fixed time intervals. This thread monitors the memory usage pattern by tracking which memory addresses are used by the code.

The page manager 202 may store the runtime usage pattern information for the current execution session 228 in a page manager storage 230. The page manager 202 may also retrieve historic runtime usage pattern information from previous execution sessions 232 from the page manager storage 230. The historic runtime usage pattern information 232 relates to the runtime usage pattern of the same code from previous execution sessions, preferably in a similar hardware configuration and optionally includes execution parameters of each execution session, for example, sizes of input and/or output buffers and any other parameters which may affect the usage pattern. In a server environment, for example, the same code may be repeatedly executed by various consumers a large number of times. Unlike the CPU case, on a GPU, the memory usage patterns tend to be similar over repeated executions.

The page manager 202 may use a combination of the source code hints 210, the compiler hints 214, the finalizer hints 220, the runtime usage pattern information 226, and the historic runtime usage pattern information 232 to predict the GPU paging. It is noted that while the source code hints 210, the compiler hints 214, and the finalizer hints 220 are distinct types of hints, they may be interrelated. For example, the source code hints 210 may serve as input for another hint type. Furthermore, the page manager 202 may provide various algorithms to jointly consider the different hint types, including, but not limited to, weighting the hints based on the source of the hint.

It is also possible to distinguish between read memory usage patterns (i.e., reading from input buffers) and write memory usage patterns (i.e., writing to intermediate buffers or to output buffers). Distinguishing between the read memory usage patterns and the write memory usage patterns helps properly determine the memory usage patterns. Otherwise, the memory usage pattern may become convoluted and be difficult to determine.

Figure 4A:
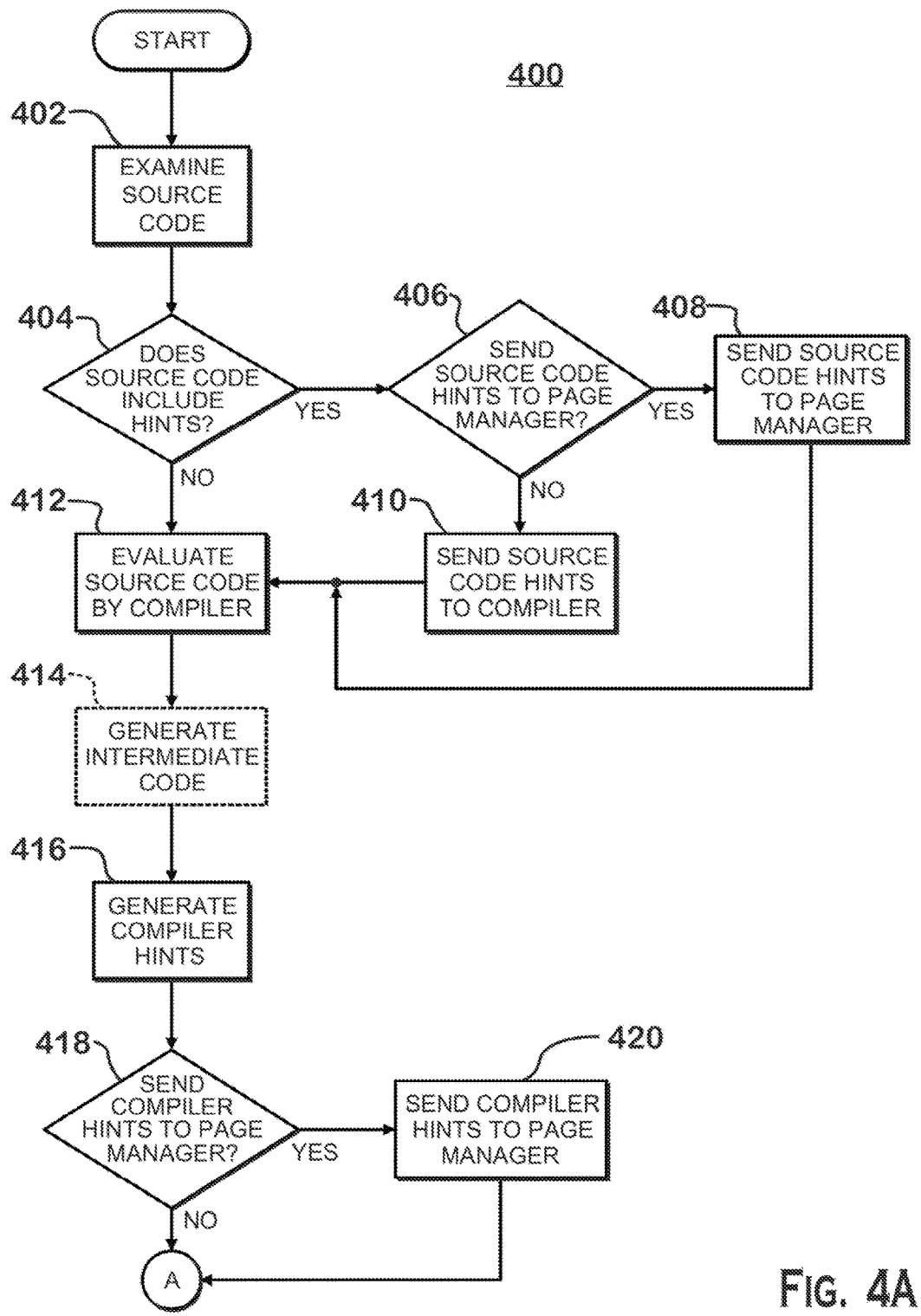
FIGS. 4A and 4B are a flowchart of a method for predicting GPU paging.
Figure 4B:
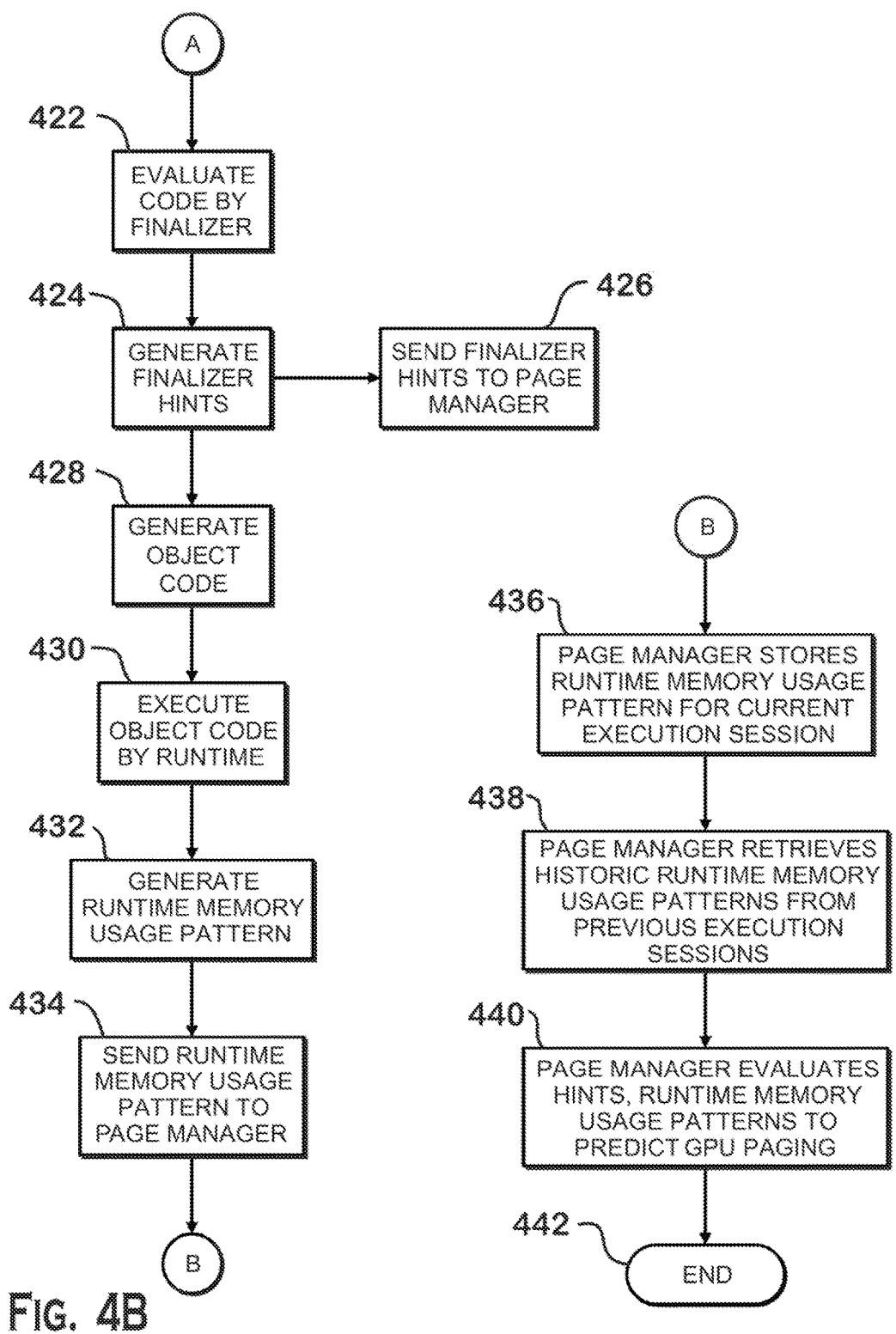

FIGS. 4A and 4B are a flowchart of a method 400 for predicting GPU paging. The source code to be compiled and executed is examined (step 402) to determine whether it includes any hints relating to the memory usage pattern (step 404). This initial examination may be performed by the compiler as part of a pre-processing phase. If the source code contains hints, then a determination is made whether the source code hints are to be sent to the page manager (step 406). If true, then the source code hints are sent to the page manager (step 408); if not, then the source code hints are sent to the compiler for further evaluation (step 410). The source code hints are generated and sent to the page manager separately from the code compilation process.

The compiler evaluates the source code (step 412) and optionally generates an intermediate code (step 414). The compiler generates compiler hints, either on its own or based on the source code hints (step 416) and a determination is made whether to send the compiler hints to the page manager (step 418). If true, then the compiler hints are sent to the page manager (step 420); if not, then the compiler hints are sent to the finalizer along with the intermediate code (if generated) for further evaluation.

The finalizer evaluates the code (either the intermediate code if generated or the source code) (step 422) and generates finalizer hints, based on either its evaluation of the source code or the intermediate code, or the compiler hints (step 424), which are then sent to the page manager (step 426). The finalizer generates object code (step 428) which is executed by the runtime (step 430). During execution, the runtime generates a runtime memory usage pattern (step 432) and sends the runtime memory usage pattern to the page manager (step 434). The page manager stores the runtime memory usage pattern for the current execution session in a page manager storage (step 436).

The page manager retrieves historic runtime memory usage patterns from previous execution sessions of the same code from the page manager storage (step 438). The page manager evaluates the hints (from the source code, the compiler, and/or the finalizer), the runtime memory usage pattern from the current execution session, and the historic runtime memory usage patterns from previous execution sessions to predict the GPU paging (step 440). The method then terminates (step 442).

Figure 5:
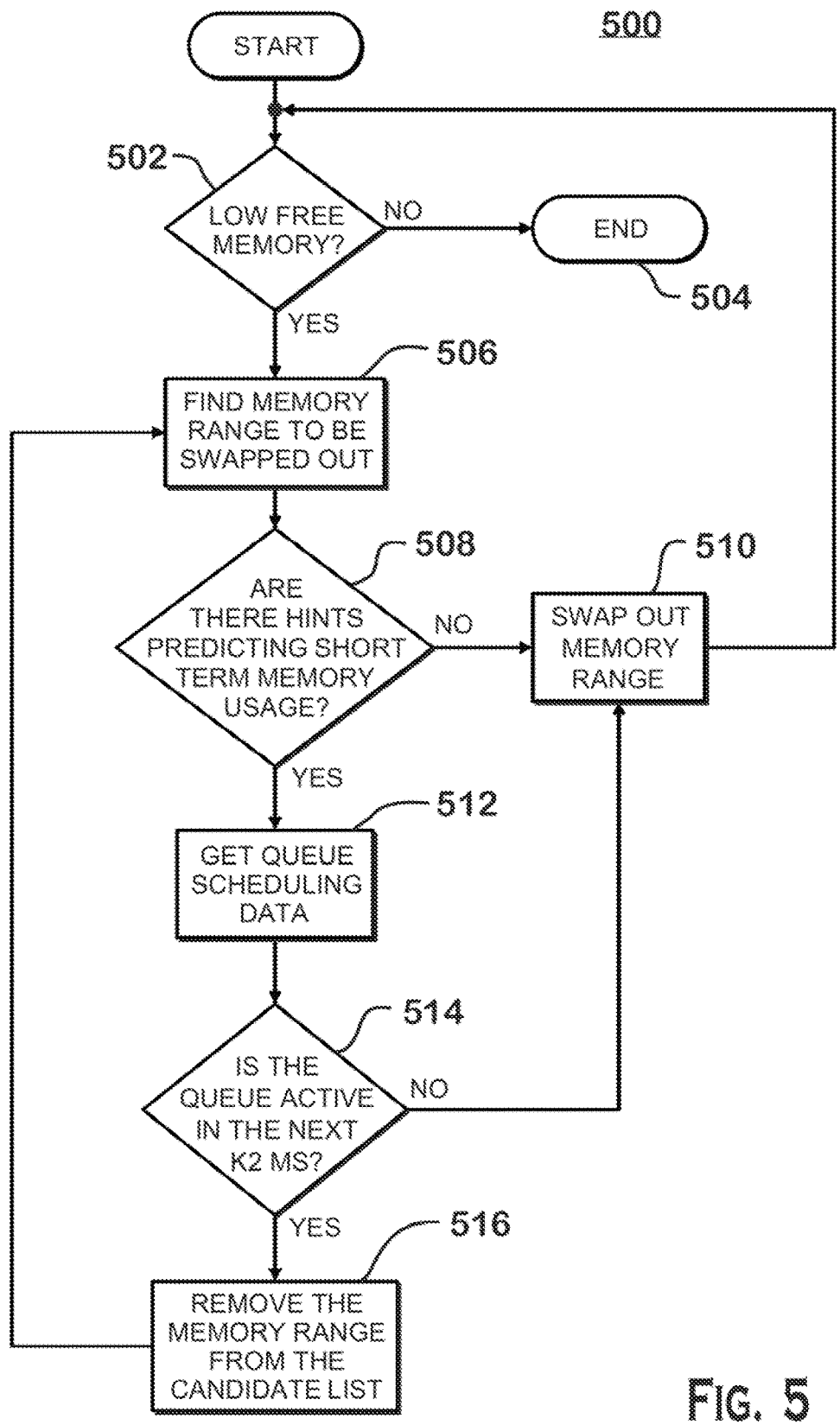
FIG. 5 is a flowchart of a method for swapping pages out of memory.

FIG. 5 is a flowchart of a method 500 for swapping pages out of memory, performed by the page manager. Usually, the units of operation are memory ranges containing an integer number of contiguous memory pages. The method 500 may be activated periodically, for example, due to a signal indicating that the free resident memory available for GPU-related processes is below a predetermined threshold or due to other conditions.

The method 500 begins by determining whether there is a condition of low free resident memory below a predetermined threshold (step 502). If the free memory is above the threshold, the method terminates (step 504). If the free memory is below the threshold, the page manager searches for a memory range to be swapped out (step 506). The page manager may search for the memory range to be swapped out based on any known technique, including, for example, a highest Least Recently Used (LRU) score, a highest Least Frequently Used score, or an aging score. Once such a memory range is located, it is selected for further processing.

Next, a determination is made whether there are any hints available to predict short term usage (for example, within the next K1 milliseconds) of memory addresses within the selected memory range (step 508). If are no hints, then the selected memory range is swapped out (step 510), and the method continues with step 502.

If there are hints available, then it still may be possible to swap out the selected memory range, if the queue (or queues) pertaining to the selected memory range are not going to be scheduled to work on a GPU and/or CPU on the next K2 milliseconds. The hint-based memory usage predictions are calculated in "net active time," i.e., considering only the time frames by which the queue(s) pertaining to memory ranges are actively attached to the hardware.

The queue scheduling data is obtained from the queue scheduler (step 512), and a determination is made whether the queue pertaining to the selected memory range is predicted to be active in the next K2 milliseconds (step 514). If not, then the selected memory range is swapped out (step 510), and the method continues with step 502.

If the queue will be active in the next K2 milliseconds, then the selected memory range is removed from the candidate list of memory ranges to be swapped out (step 516), and the next candidate memory range is selected (step 506).

Figure 6:
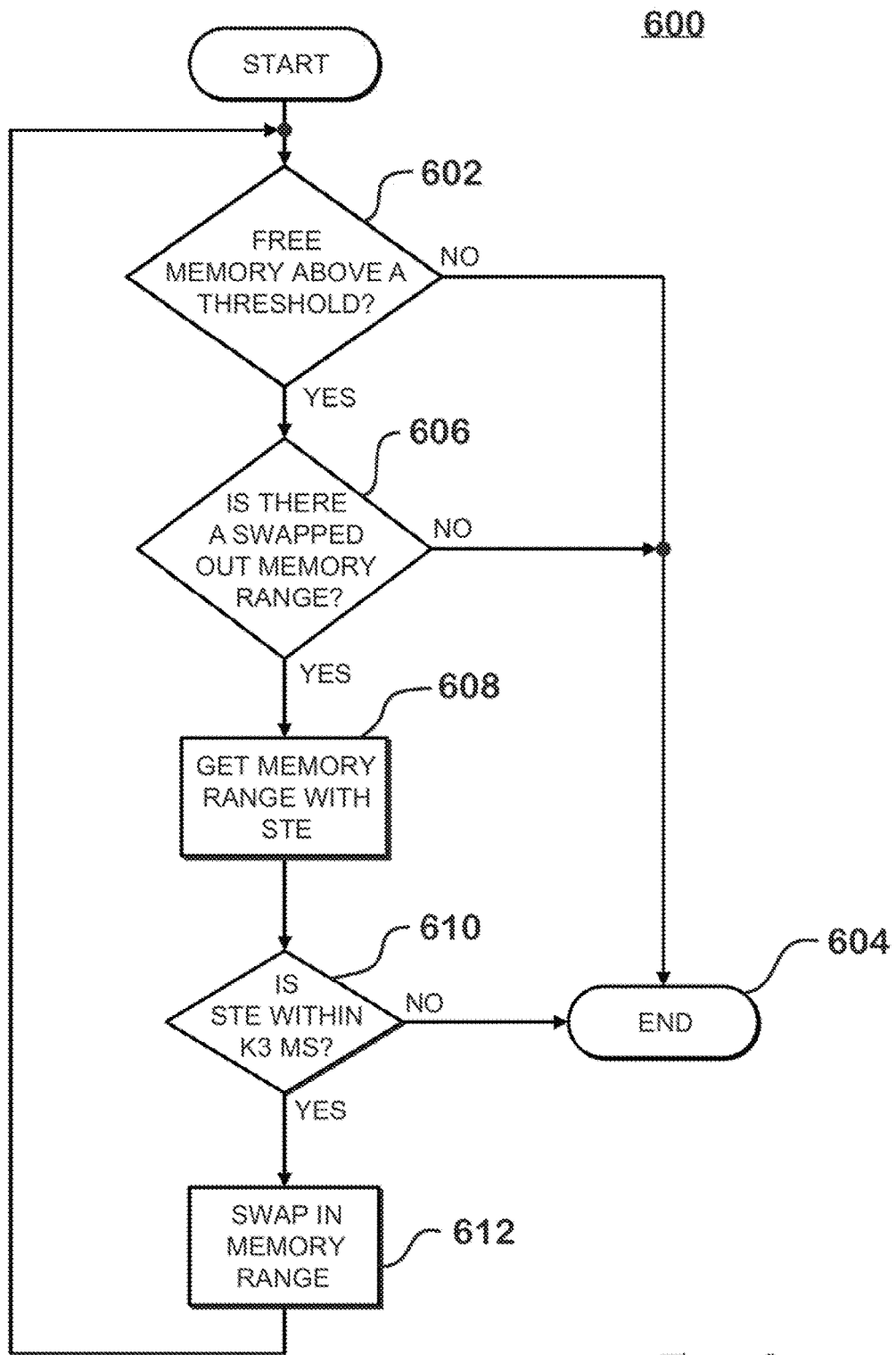
FIG. 6 is a flowchart of a method for swapping pages into memory.

FIG. 6 is a flowchart of a method 600 for swapping pages into memory, performed by the page manager. The method 600 may be activated on a periodic basis, for example. A determination is made whether there is free resident memory above a predetermined threshold (step 602). If the free memory is below the predetermined threshold, then the method terminates (step 604).

If the free memory is above the predetermined threshold, a determination is made whether there is at least one swapped out memory range pertaining to GPU workload execution (step 606). If there are no such memory ranges, then the method terminates (step 604). If there are such memory ranges, the memory range with a shortest predicted time until execution (STE) is selected (step 608). The STE value is maintained in a data structure of memory ranges, for example, by the periodic update procedure described below in connection with FIG. 7. If the STE is within K3 milliseconds of the current time (step 610), then the selected memory range is swapped in (step 612) and the method 600 continues with step 602. If the STE is not within K3 milliseconds of the current time, then the method terminates (step 604).

Figure 7:
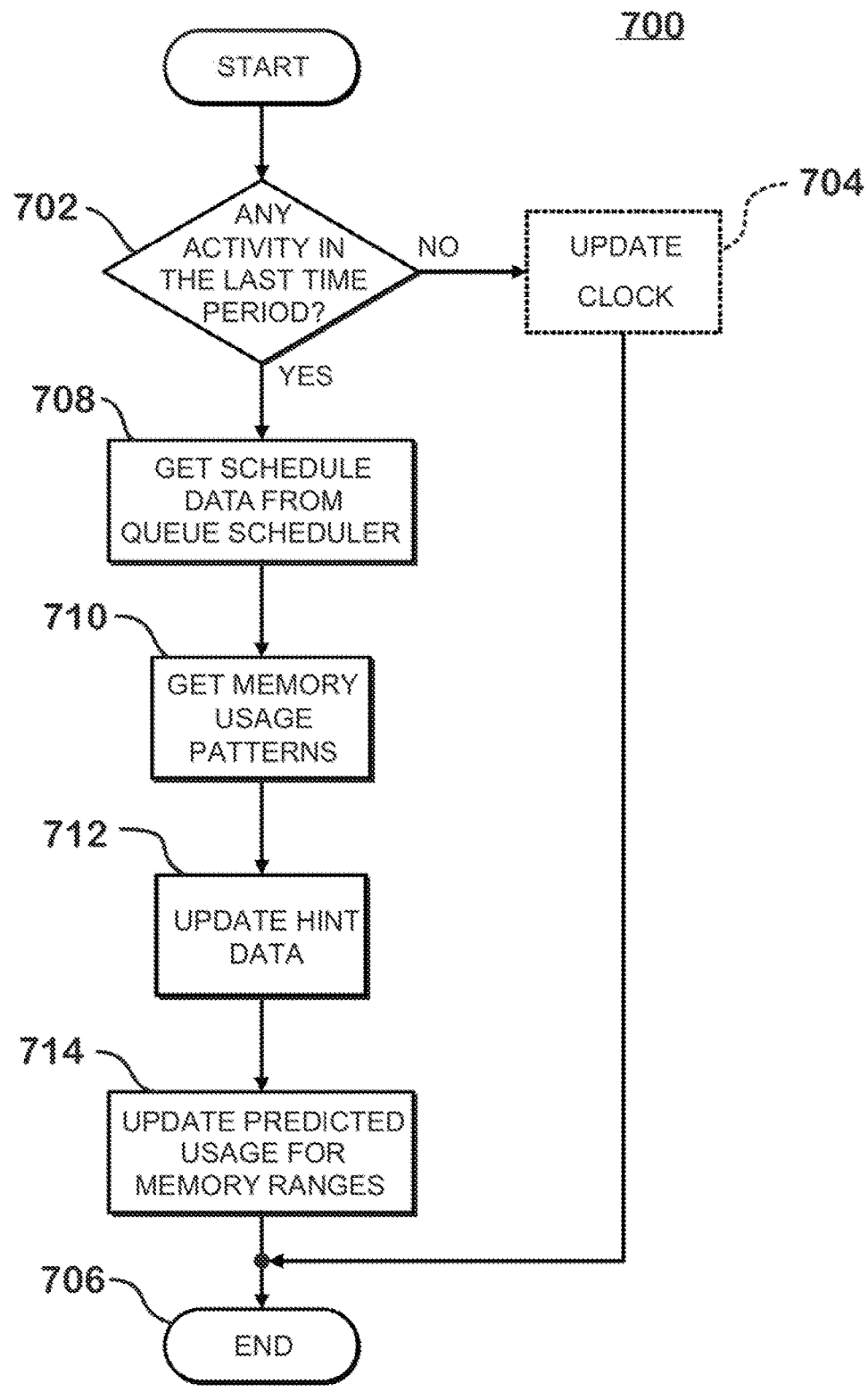
FIG. 7 is a flowchart of a method for performing a periodic update by the page manager.

FIG. 7 is a flowchart of a method 700 for performing a periodic update by the page manager. A determination is made whether there has been memory usage activity pertaining to GPU workloads in a last time period (step 702). If there has not been any such memory usage activity, then the clocks pertaining to queues' active execution times are optionally updated (step 704) and the method terminates (step 706). It is noted that there are probably no such active execution times, because no memory usage activity has been detected in this time period.

If memory usage activity has been detected (step 702), then scheduling data is obtained from the queue scheduler for the last time period (step 708), a memory usage log is obtained from the hardware (step 710), and any updates of the hint data are obtained (step 712). The predicted time until execution for memory ranges are updated, based on the scheduling data, the memory usage log, and the hint data (step 714) and the method terminates (step 706). The predicted time until execution is preferably based on actual active periods of the queues.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing memory management in an accelerated processing unit, comprising:
   receiving hints about memory usage of an application;
   receiving at least one runtime memory usage pattern of the application;
   selecting a memory range to be swapped out if an amount of free memory is below a threshold;
   if the hints do not suggest that the memory range will be used within a first predetermined period of time, swapping the selected memory range out of memory; and
   if the hints suggest that the memory range will be used within the first predetermined period of time:
      obtaining queue scheduling data for a queue associated with the selected memory range;
      swapping the selected memory range out of the memory based on the hints and the at least one runtime memory usage pattern if the queue is not scheduled to be active within a second predetermined period of time,
   wherein the hints include at least two of: source code hints included in a source code form of the application; compiler hints produced by a compiler during compilation of the application; and finalizer hints produced by a finalizer during compilation of the application.

2. The method according to claim 1, wherein the at least one runtime memory usage pattern is generated by a runtime component when the application is executing.

3. The method according to claim 1, wherein the at least one runtime memory usage pattern further includes historic runtime memory usage pattern information from previous execution sessions of the application.

4. The method according to claim 3, wherein the historic runtime memory usage pattern information further includes execution parameters of each execution session.

5. The method according to claim 1, further comprising:
   predicting memory paging by analyzing the hints and the at least one runtime memory usage pattern.

6. The method according to claim 5, wherein the swapping is based on the predicted memory paging.

7. A system for performing memory management in an accelerated processing unit, comprising:
   a memory comprising a plurality of memory pages;
   a processor configured to:

receive hints relating to memory usage of an application;
if an amount of free memory is below a threshold, select a range of the plurality of memory pages to be swapped out; and
if the hints do not suggest that the memory range will be used within a first predetermined period of time, swap the selected range out of the memory; and
if the hints suggest that the memory range will be used within the first predetermined period of time:
obtain queue scheduling data for a queue associated with the selected memory range;
swap the selected memory range out of memory if the queue is not scheduled to be active within a second predetermined period of time; and
remove the selected memory range from a candidate list of memory ranges to be swapped out if the queue is scheduled to be active within the second predetermined period of time,
wherein the hints include at least two of: source code hints included in a source code form of the application; compiler hints produced by a compiler during compilation of the application; and finalizer hints produced by a finalizer during compilation of the application.

8. The system according to claim 7, wherein the processor is further configured to predict memory paging by analyzing the hints and at least one runtime memory usage pattern.

9. The system according to claim 7, further comprising:
a page manager storage, configured to store historic runtime memory usage pattern information from previous execution sessions of the application.

10. The system according to claim 9, wherein the historic runtime memory usage pattern information further includes execution parameters of each execution session.

11. A non-transitory computer-readable storage medium storing a set of instructions for execution by a general purpose computer to perform memory management in an accelerated processing unit, the set of instructions comprising:
receiving hints about memory usage of an application;
receiving at least one runtime memory usage pattern of the application; and
selecting a memory range to be swapped out if an amount of free memory of the memory is below a threshold;
if the hints do not suggest that the memory range will be used within a first predetermined period of time, swapping the selected memory range out of the memory; and
if the hints suggest that the memory range will be used within the first predetermined period of time:
obtaining queue scheduling data for a queue associated with the selected memory range;
swapping the selected memory range out of the memory based on the hints if the queue is not scheduled to be active within a second predetermined period of time; and
removing the selected memory range from a candidate list of memory ranges to be swapped out if the queue is scheduled to be active within the second predetermined period of time,
wherein the hints include at least two of: source code hints included in a source code form of the application; compiler hints produced by a compiler during compilation of the application; and finalizer hints produced by a finalizer during compilation of the application.

12. The non-transitory computer-readable storage medium according to claim 11, further comprising:
executing the application and generating the at least one runtime memory usage pattern.

13. The non-transitory computer-readable storage medium according to claim 11, further comprising:
predicting memory paging by analyzing the hints and the at least one runtime memory usage pattern.

14. The non-transitory computer-readable storage medium according to claim 11, wherein the instructions are hardware description language (HDL) instructions used for the manufacture of a device.

15. A method for swapping a range of pages out of a memory, comprising:
selecting a memory range to be swapped out, if an amount of free memory is below a threshold;
swapping the selected memory range out of the memory if there are no hints available to suggest that the memory range will be used within a first predetermined period of time;
if there are hints available:
obtaining queue scheduling data for a queue associated with the selected memory range;
swapping the selected memory range out of memory if the queue is not scheduled to be active within a second predetermined period of time; and
removing the selected memory range from a candidate list of memory ranges to be swapped out if the queue is scheduled to be active within the second predetermined period of time,
wherein the hints include at least two of: source code hints included in a source code form of the application; compiler hints produced by a compiler during compilation of the application; and finalizer hints produced by a finalizer during compilation of the application.

* * * * *